US011709260B2

(12) United States Patent
Alferdaous Alazem et al.

(10) Patent No.: US 11,709,260 B2
(45) Date of Patent: Jul. 25, 2023

(54) DATA DRIVEN RESOLUTION FUNCTION DERIVATION

(71) Applicant: Zoox, Inc., Foster City, CA (US)

(72) Inventors: Badeea Ferdaous Alferdaous Alazem, Redwood City, CA (US); Venkata Subrahmanyam Chandra Sekhar Chebiyyam, San Francisco, CA (US); Joshua Kriser Cohen, Sunnyvale, CA (US); Subasingha Shaminda Subasingha, San Ramon, CA (US); Samantha Marie Ting, Redwood City, CA (US); Chuang Wang, Sunnyvale, CA (US)

(73) Assignee: Zoox, Inc., Foster City, CA (US)

( * ) Notice: Subject to any disclaimer, the term of this patent is extended or adjusted under 35 U.S.C. 154(b) by 296 days.

(21) Appl. No.: 17/245,929

(22) Filed: Apr. 30, 2021

(65) Prior Publication Data
US 2022/0350018 A1 Nov. 3, 2022

(51) Int. Cl.
*G01S 13/931* (2020.01)
*G01S 13/89* (2006.01)
*G01S 17/95* (2006.01)
*G01S 13/86* (2006.01)

(52) U.S. Cl.
CPC .......... *G01S 13/931* (2013.01); *G01S 13/865* (2013.01); *G01S 13/89* (2013.01); *G01S 17/95* (2013.01)

(58) Field of Classification Search
CPC ...... G01S 13/931; G01S 13/865; G01S 13/89; G01S 17/95
See application file for complete search history.

(56) References Cited

U.S. PATENT DOCUMENTS

| 11,231,481 | B1* | 1/2022 | Cohen ................. G01S 7/2927 |
| 2010/0026555 | A1* | 2/2010 | Whittaker ............ G05D 1/0278 382/224 |
| 2012/0053755 | A1* | 3/2012 | Takagi ................. G01S 7/4808 701/1 |
| 2013/0265189 | A1* | 10/2013 | Chang ................. G01S 13/865 342/52 |
| 2014/0142800 | A1* | 5/2014 | Zeng ..................... G01S 13/867 701/30.6 |

(Continued)

OTHER PUBLICATIONS

PCT Search Report and Written Opinion dated Aug. 9, 2022 for PCT Application No. PCT/US22/25185, 13 pages.

*Primary Examiner* — Peter M Bythrow
(74) *Attorney, Agent, or Firm* — Lee & Hayes, P.C.

(57) ABSTRACT

Techniques for determining a probability of a false negative associated with a location of an environment are discussed herein. Data from a sensor, such as a radar sensor, can be received that includes point cloud data, which includes first and second data points. The first data point has a first attribute and the second data point has a second attribute. A difference between the first and second attributes is determined such that a frequency distribution may be determined. The frequency distribution may then be used to determine a distribution function, which allows for the determination of a resolution function that is associated with the sensor. The resolution function may then be used to determine a probability of a false negative at a location in an environment. The probability can be used to control a vehicle in a safe and reliable manner.

20 Claims, 9 Drawing Sheets

(56) References Cited

U.S. PATENT DOCUMENTS

| | | | |
|---|---|---|---|
| 2015/0331098 A1* | 11/2015 | Luebbert | G01S 7/354 |
| | | | 342/91 |
| 2017/0147888 A1* | 5/2017 | Zeng | G06T 7/77 |
| 2017/0248963 A1* | 8/2017 | Levinson | G01C 21/26 |
| 2018/0284234 A1 | 10/2018 | Curatu | |
| 2019/0178974 A1 | 6/2019 | Droz | |
| 2019/0179026 A1* | 6/2019 | Englard | G06F 18/2163 |
| 2019/0205700 A1* | 7/2019 | Gueguen | G06T 3/40 |
| 2019/0311546 A1* | 10/2019 | Tay | G05D 1/0088 |
| 2019/0391250 A1* | 12/2019 | Cohen | G01S 13/87 |
| 2020/0255030 A1* | 8/2020 | Yamamoto | G01S 17/931 |
| 2020/0355820 A1* | 11/2020 | Zeng | G01S 13/865 |
| 2021/0256718 A1* | 8/2021 | Gangundi | G06T 15/08 |
| 2022/0153297 A1* | 5/2022 | Chen | G01S 13/505 |
| 2023/0059090 A1* | 2/2023 | Jordan | B60W 40/105 |

\* cited by examiner

DATA DRIVEN RESOLUTION FUNCTION DERIVATION

BACKGROUND

Data can be captured by a radar system to detect objects in the surrounding environment of a device, such as an autonomous vehicle. Using the captured data, the autonomous vehicle may be guided through the surrounding environment. For instance, autonomous vehicles utilize route planning methods, apparatuses, and systems to navigate through areas that may include other vehicles, buildings, pedestrians, or other objects. In some examples, the captured data includes reflections of the vehicles, buildings, and/or objects in the surrounding environment. These reflections may interfere with the captured data and prevent other objects within the surrounding environment from being visible to the radar system, which can present challenges in the autonomous vehicle safely traversing through such areas.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
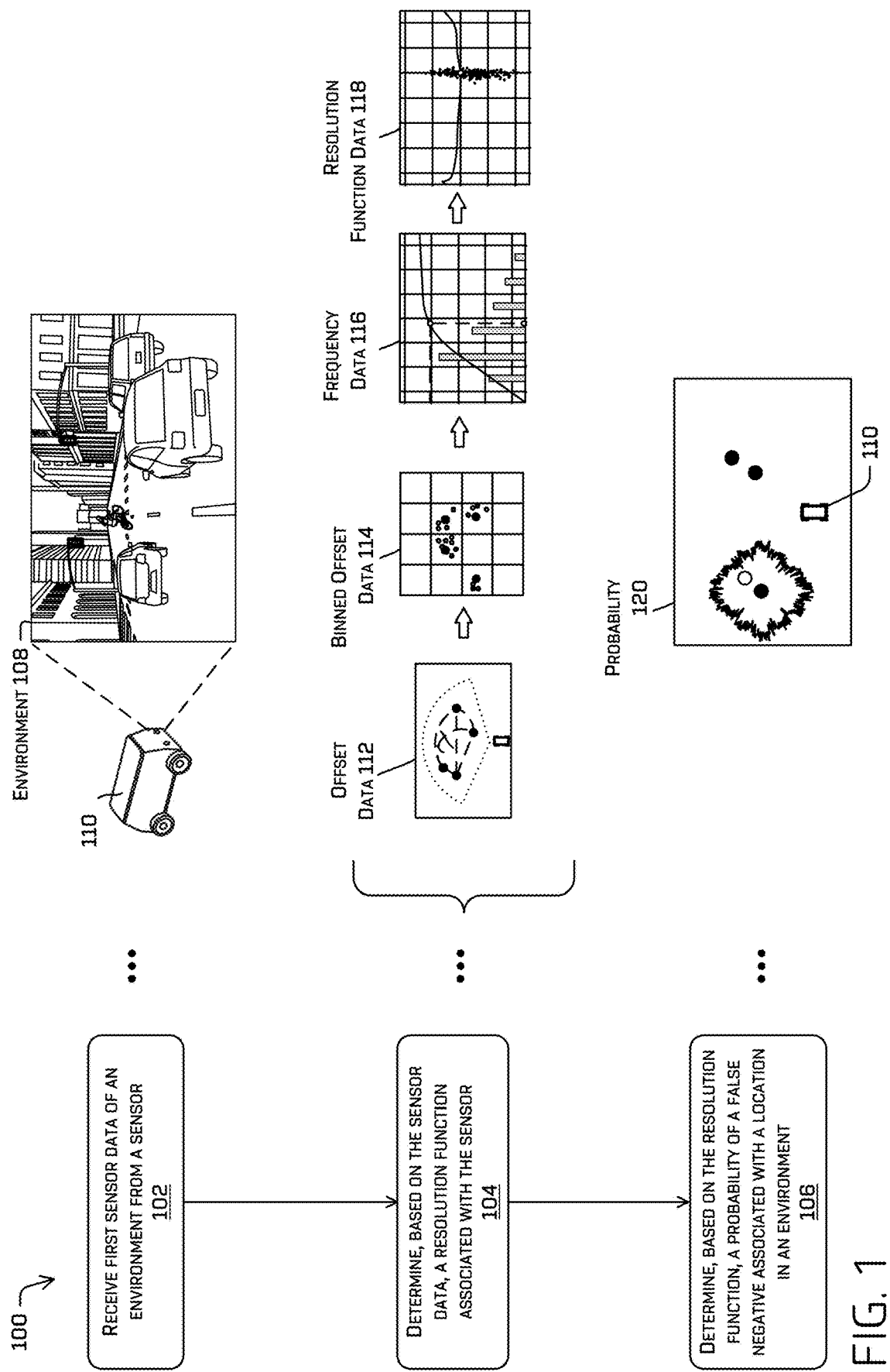
FIG. 1 is a pictorial flow diagram of an example process in accordance with examples of the disclosure.

Techniques for determining a probability of a false negative associated with a location of an environment are discussed herein. For example, sensor data can be captured of an environment and can be analyzed to determine a resolution function indicative of a resolution of a sensor based on data captured in an environment. Such a resolution function can be used to determine a probability of a false negative associated with a location in an environment.

In some examples, false positive suppression techniques for radar may comprise determining a detection threshold to reduce a number of false positives and/or to keep the number of false positives below a specified false positive rate. For example, constant false alarm rate techniques (CFAR), such as cell-averaging CFAR (CA-CFAR), tests each cell (i.e., portion) of radar data to see if a signal associated with a cell of interest meets or exceeds a detection threshold determined by averaging the signal of the cell of interest and/or signals associated with cells around the cell of interest. This presumes that, if the cell of interest includes a return signal, the cells around the cell of interest are likely to provide a good estimate of the noise in that scanned region. Other techniques may be used alternately or additionally to a CFAR technique, such as selecting a maximal portion of a signal associated with a cell as a return signal.

However, false positive suppression techniques tend to increase the number of false negatives, i.e., portions of a signal generated by the sensor that are attributable to a reflection from an object but are suppressed. For vehicles, a false negative—a failure to identify an object that exists in an environment surrounding the vehicle—presents a great risk to operating the vehicle safely and efficiently.

The techniques discussed herein comprise determining a probability that a portion of radar data may comprise a false negative. For example, the portion of radar data may be associated with a portion of an environment scanned by a radar device (e.g., a portion of the environment corresponding to a distance or azimuth of the radar data). The techniques may describe determining such a likelihood for one or more portions of the environment in association with a resolution function that determines the resolution of sensors when detecting objects in the environment. Based on the resolution function and radar data, objects otherwise obscured in the environment may be detected by the autonomous vehicle. In some examples, an autonomous vehicle may generate a trajectory for controlling operation of the autonomous vehicle based at least in part on one or more likelihoods determined according to the techniques discussed herein.

In some examples, the radar data may comprise a data point cloud that represents objects in an environment. The data point cloud includes data points that represent one or more locations on surfaces of the environment. For purposes of discussion, each data point cloud includes one data point that represents an object, although it is appreciated that a data point cloud typically includes more than one data point. Each data point may be associated with multiple dimensions (e.g., range, range rate, azimuth and/or power) and include coordinates determined by a defined coordinate system. Since data points can be captured by different radar sensors and/or at different angles, the data points are correlated to account for any offsets of the sensors and angles when obtaining the data. To correlate the radar data, the data points are arranged into like dimensions. For example, the range dimension of two data points is separated from the azimuth dimension the two data points. Once a list of data point dimensions has been determined, offsets may be calculated for each data point in respective dimensions. Offset data may be determined as the difference between a data point and some or all other data points in the point cloud data.

In some examples, the techniques may comprise distributing the offset data onto a spatial grid, in which cells in the spatial grid are associated with regions or locations in the environment of the autonomous vehicle. Each cell on the spatial grid may also correspond to a bin, which stores the radar data associated with a particular dimension. As data points are collected by the sensors of the autonomous vehicle, the data points are stored (i.e., binned) into the bin with a range corresponding to a value of the data points. These data points stored in the bin are referred to herein as binned offset data. For example, if a data point has a range value equal to 2 meters, the data point will be stored in a bin having a range between 1 meter and 3 meters. The binned offset data is counted and used to construct a frequency distribution (i.e., frequency histogram) showing how data points in each bin are distributed in cells of the spatial grid.

The techniques described herein may also generate a frequency distribution of binned offset data. The binned offset data may be used to determine a resolution function, which may be based on a cumulative distribution function of the binned offset data and a detection threshold. In some examples, the frequency distribution is determined based on the count or number of total data points accumulated in bins of the spatial grid. For example, one hundred data points may be stored in a bin of the spatial grid, where each of the data points are for a power offset of a particular dimension offset (e.g., a particular range offset, range rate offset and/or azimuth offset). The frequency distribution, comprising the data points from each of the bins in the spatial grid, may then be used to form the cumulative distribution function, which quantifies a probability of observing certain data point power intensities within the data of the frequency distribution. From the cumulative distribution function, a detection threshold may be determined such that a majority of the data points collected by the sensors of the autonomous vehicle are detected for a range of power offset values in different dimension offsets. Based on the detected threshold, a resolution function associated with a sensor may be determined.

In some examples, the likelihood of a portion of the radar data is determined to be a false negative or a true positive. The likelihood is based at least in part on the resolution function and at least a portion of the radar data. For example, the resolution function may be determined for a range of power offset values over a range of distances. In one example, as the range offset value between objects increases (e.g., objects are located further away from each other in an environment), the likelihood of a true positive increases. In another example, as the power offset value increases (e.g., the difference in power values between returns increases), the likelihood of a false negative increases. In some instances, a likelihood that an object was failed to be detected may be determined for one or more object types. For example, the techniques may comprise determining a first likelihood that a pedestrian wasn't detected, a second likelihood that a large vehicle wasn't detected, a third likelihood that a small vehicle wasn't detected, etc.

In some examples, the autonomous vehicle may generate a trajectory for controlling operation of the autonomous vehicle based at least in part on the resolution function and radar data. The techniques may thereby improve the safety and efficiency of operation of the autonomous vehicle.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In another example, the techniques can be utilized in a manufacturing assembly line context, in an aerial surveying context, or in a nautical context. Additionally, the techniques described herein can be used with real data (e.g., captured using sensor(s)), simulated data (e.g., generated by a simulator), or any combination of the two.

FIG. 1 is a pictorial flow diagram of an example process 100 of capturing sensor data, determining a resolution function, and determining a probability of a false negative associated with a location of an environment 108.

An operation 102 can include receiving sensor data, for example from a radar device, from an autonomous vehicle 110 in an environment 108. An example of sensor data collected by the sensors is illustrated in the environment 108, such as for example any different number of types of objects (e.g. a vehicle, a pedestrian, a bicycle, a traffic light, etc.). As shown, the environment 108 includes objects that are detected or otherwise sensed by an autonomous vehicle 110. The operation 102 can include receiving lidar data, image data, radar data, audio data, time of flight data, and the like. In some examples, the received sensor data of objects detected or otherwise sensed in the environment 108 may comprise an indication (i.e., data attributes) of a range (e.g., distance), range rate (e.g., doppler or velocity), azimuth (e.g., scanning angle at which an object is detected), elevation (e.g., altitude), and/or received power (e.g., magnitude and/or power of a return signal) associated with a signal returned by the radar device. In one example, the sensor data includes raw sensor data in the form of point cloud data, in which the point cloud data includes data points with one or more attributes or dimensions. Further, the operation 102 can include receiving sensor data from a single sensor or multiple sensors. The operation 102 can include receiving sensor data associated with a single time (or sensor data associated with substantially the same time, based on technical tolerances) or sensor data captured over a period of time. In some examples, the operation 102 can be performed by the autonomous vehicle 110 as it traverses the environment 108.

At operation 104, the raw sensor data can be collected by the sensors and output as the point cloud data. The point cloud data may then be binned and analyzed to determine a detection threshold and resolution function associated with the sensors. For example, the collected radar data is output as point cloud data that includes a set of data points representing surfaces of the objects detected in the environment 108. For each point in the point cloud data, spatial offset data 112 is determined such that the point cloud data collected from the sensors is set to a same coordinate system. The offset data 112 is then binned (i.e., associated with a discrete region), for example onto a spatial grid, in which each "bin" of the spatial grid is associated with a location or region in the environment 108. In one example, the offset data 112 is binned according to the attributes associated with each point in the offset data 112. Although the offset data 112 is illustrated as two-dimensional offset data, in some examples, offsets can be determined across multiple dimensions and across multiple attributes.

The binned offset data 114 may then be used to demonstrate the frequency of data points accumulated by the sensors over a period of time for a power offset range of one or more attribute (dimension) values. For example, frequency data 116 (the number of accumulated data points) can be plotted as a frequency distribution on a graph in which the count (i.e., frequency) of data points has a value within the corresponding bin of the spatial grid. That is, the count of data points in a bin of the spatial grid is plotted on the graph. As shown in the example, the number of data points is represented by the vertical bars extending along the vertical axis of the graph and the edge of each bin is represented by the power offsets along the horizontal axis, where the edge-to-edge value of a bin is referred to as a bin range. For example, the number of data points that fall within a power offset for a particular bin range of the spatial grid is counted. Once a count has been determined for each power offset bin range, a distribution function of the power offset may be plotted on the spatial grid. In some examples, the distribution function is a cumulative distribution function (CDF). By applying a detection threshold point to the distribution function, a resolution function, illustrated as resolution function data 118, of the sensors used to collect the sensor data may be determined.

Additional details of the offset data 112, the binned offset data 114, the frequency data 116, and the resolution function data 118 are discussed throughout this disclosure.

At operation 106, the resolution function determined in operation 104 may be used to determine a probability 120 of a false negative associated with a location in the environment 108. In one example, the resolution function and/or the probability of a false negative may also be used to control the autonomous vehicle 110, as described herein. In some examples, the resolution function determined in operation 104 may be used to determine a region associated with a false negative corresponding to a location in the environment 108. The region may be based, for example, on an expected sensor profile of an object in the environment 108. That is, the data captured by the sensor for a particular object (e.g., a pedestrian) matches a profile of data for the particular object (i.e. the returned sensor data is indicative of a pedestrian).

Figure 2:
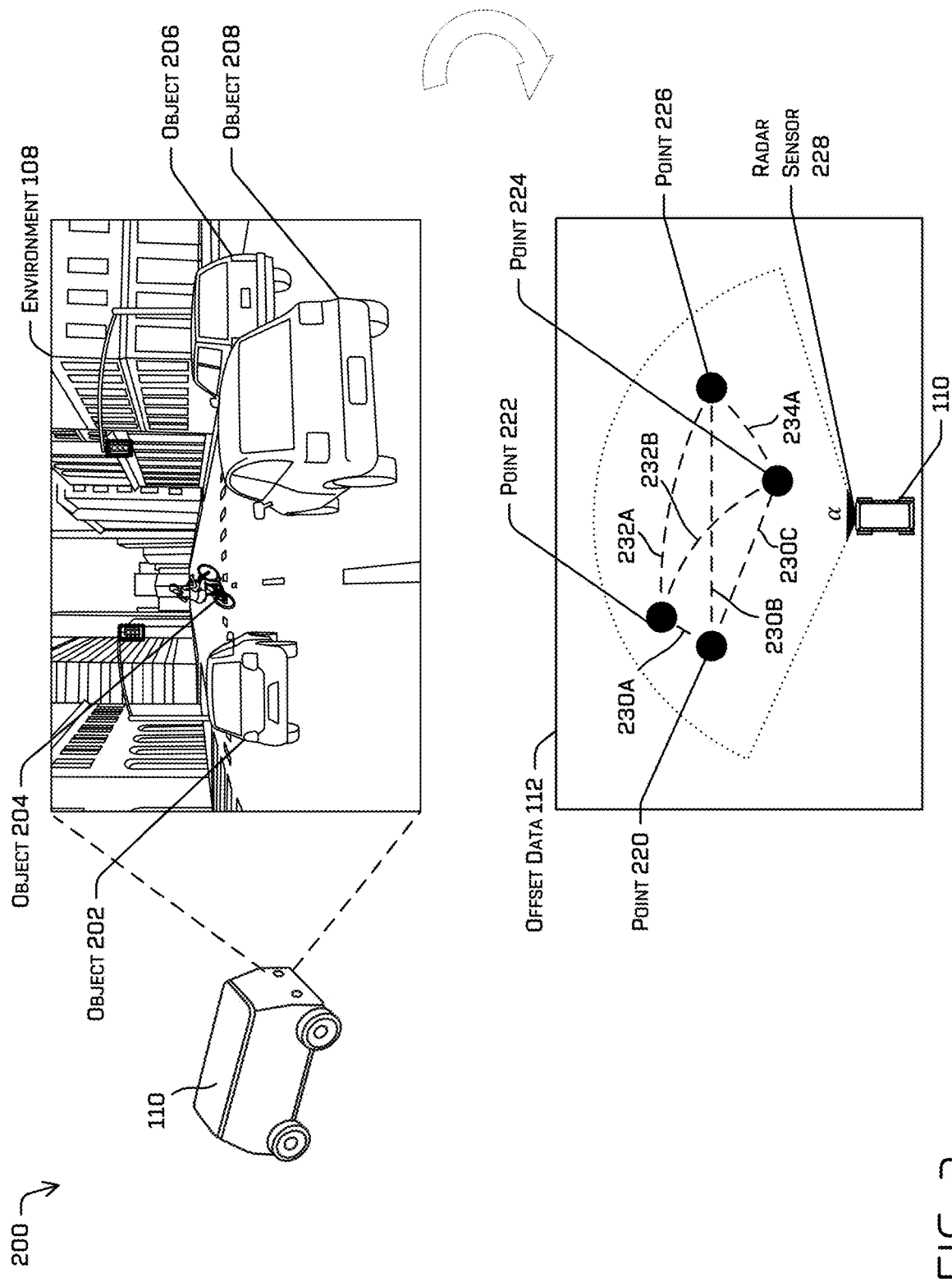
FIG. 2 illustrates an example autonomous vehicle that detects objects while traveling in an environment.

FIG. 2 illustrates an example autonomous vehicle 110 that detects objects while traveling in an environment 108. The autonomous vehicle 110 is depicted as having four wheels and respective tires each of the wheels. However, other types of configuration of autonomous vehicles are contemplated, such as vans, sport utility vehicles, cross-over vehicles, trucks, buses, agricultural vehicles, and construction vehicles. The autonomous vehicle 110 may be powered by one or more internal combustion engines, one or more electric motors, hydrogen power, any combination thereof, and/or any other suitable power sources. In addition, although the example autonomous vehicle 110 has four wheels, the systems and methods described herein may be incorporated into vehicles having fewer or a greater number of wheels, tires, and/or tracks.

According to the techniques discussed herein, the autonomous vehicle 110 may receive radar sensor data from sensor(s) of the autonomous vehicle 110. Sensors may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, and/or other depth-sensing sensor), an image sensor (e.g., a camera), an audio sensor (e.g., a microphone), and/or environmental sensor (e.g., a barometer, a hygrometer, etc.).

The sensor data may include, but is not limited to, a location signal (e.g., a GPS/GNSS signal, a location determined from map data, etc.), an inertia signal (e.g., an accelerometer signal, a gyroscope signal, etc.), a magnetometer signal, a wheel encoder signal, a speedometer signal, a point cloud of accumulated LIDAR and/or RADAR points, an image (or images), an audio signal, and/or bariatric or other environmental signals, and the like. For example, the autonomous vehicle 110 may receive point cloud data including a set of data points from the sensors of the autonomous vehicle 110. This point cloud data may be captured as raw sensor data that is processed and output as the point cloud data. The discussion herein primarily discusses point cloud data, but it is contemplated that the techniques may be applied to any sensor data that has the capability to discretely represent an object.

Figure 8:
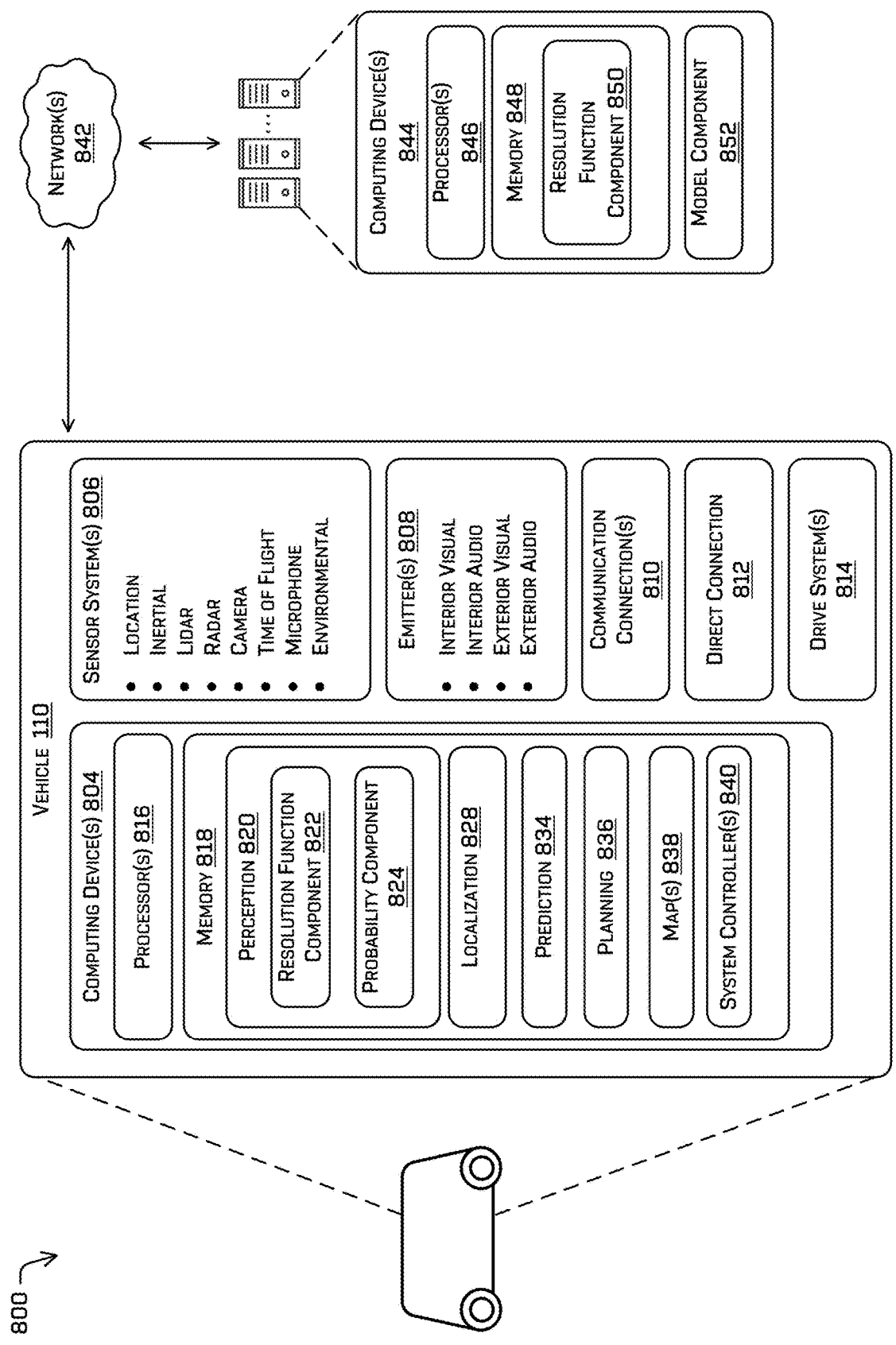
FIG. 8 illustrates a block diagram of an example system that implements the techniques discussed herein.

In one example, the sensors may generate sensor data, which may be received by computing devices (for example, the computing device described in more detail with respect to FIG. 8) associated with the autonomous vehicle 110. However, in other examples, some or all of the sensors and/or computing devices may be separate from and/or disposed remotely from the autonomous vehicle 110 and data capture, processing, commands, and/or controls may be communicated to/from the autonomous vehicle 110 by one or more remote computing devices via wired and/or wireless networks.

In one example, the sensor is a radar sensor or radar device 228, which may be associated with autonomous vehicle 110 and/or may collect radar sensor data as the autonomous vehicle 110 traverses the environment 108. In some examples, the radar sensor 228 may have a field of view (FoV), a, covering at least a portion of the environment 108 surrounding the autonomous vehicle 110, i.e., a scanned region. In various examples, the autonomous vehicle 110 may have any number of one or more radar sensors 228. In the illustrated example, the FoV, a, is depicted as being about a 110-degree view. However, in other examples, the FoV of the radar sensors 228 can be greater than (e.g., 120 degrees, 180 degrees, 220 degrees, 270 degrees, 360 degrees) or less than (e.g., 90 degrees, 60 degrees, 45 degrees) this angle. Moreover, the autonomous vehicle 110 may include multiple radar sensors of devices 228 having multiple different FoVs, distances, scan rates, and the like. In some examples, the autonomous vehicle 110 may include multiple radar sensors 228 with at least partially overlapping FoVs such that multiple radar sensors 228 capture at least portion of the environment in common. In still other examples, the radar sensors or devices 228 may be set to process objects in the environment 108 at different resolutions.

In some examples, the computing device(s) may comprise a perception system and/or a planning system (FIG. 8). In general, the perception system may determine what is in the environment 108 surrounding the autonomous vehicle 110 and the planning system may determine how to operate the autonomous vehicle 110 according to information received from the perception system regarding the environment 108. Data produced by the perception system may be collectively referred to as "perception data."

In the depicted example, the environment 108 illustrates the perception data returned by the sensors in the autonomous vehicle 110. As shown, the environment 108 traversed by the autonomous vehicle 110 includes a road with a center line providing a guide for the path of the autonomous vehicle 110 to travel. The environment 108 also includes objects that are detectable by the radar sensors or devices 228 of the autonomous vehicle 110. For example, the environment 108 includes a first object 202, a second object 204, a third object 206, and a fourth object 208. In one example, objects 202, 206 and 208 are vehicles (which may also be autonomous) traveling in the environment 108, and object 204 is a cyclist (i.e., a pedestrian on a bicycle) peddling in front of the vehicles (i.e., objects 202, 206 and 208). The environment 108 also includes a crosswalk that provides pedestrians and cyclists with a guide for crossing the road. Also shown in the environment 108 are traffic signals and buildings.

The planning system 836 (FIG. 8) may use the perception data to localize a position of the autonomous vehicle 110 on a global map and/or a local map, determine one or more trajectories, control motion of the autonomous vehicle 110 to traverse a path or route, and/or otherwise control operation of the autonomous vehicle 110. For example, the planning system 836 may determine a route for the autonomous vehicle 110 based at least in part on the point cloud data and the resolution function in which to control the vehicle to traverse the route. Controlling the autonomous vehicle 110 in this manner will enable it to avoid objects detected in the environment, as well as incorporate a probability or likelihood of where an object may not have been detected by the sensors, discussed further below.

For the planning system 836 to determine whether an object may be impeding the autonomous vehicle 110 from safely traversing the route, the sensors on the autonomous vehicle 110 should be able to analyze and interpret the collected sensor data. Such sensor data, as noted above, can include point cloud data. The point cloud data can be representative of objects that are present within one or more locations or regions of the environment 108. The objects can include static or inanimate objects and other types of objects, such as dynamic objects, that can move relative to the autonomous vehicle 110. Inanimate objects can include, for example, buildings, signage, utility equipment (such as telephone poles, electric grid poles, base station towers, or the like), and so forth. Dynamic objects that can move relative to the autonomous vehicle 110 can include, for example, pedestrians, animals (wildlife and domesticated), hikes, cars (autonomous or otherwise), trucks, buses, and the like.

In one example, the point cloud data collected by the sensors includes multiple data points or a cluster of data points. As noted above, these data points in the point cloud data may be representative or otherwise indicative of the objects in the environment 108. Each of the data points may include coordinates determined by a defined coordinate system, such as a Cartesian coordinate system or another type of orthogonal coordinate system, utilized to characterize a position of the autonomous vehicle 110 relative to the environment 108. For example, each data point may be represented by a coordinate system, such as a three-dimensional (3D) coordinate (e.g., x, y, z) and include multiple attributes (dimensions), such as range, range rate, azimuth, elevation, and power. However, it is appreciated that the attributes are not limited to those in the disclosed example and may include additional or fewer attributes or dimensions.

In some implementations, as the autonomous vehicle 110 traverses a region of the environment 108, the radar sensors or devices 228 can generate point cloud data representative of the region. The point cloud data may be measured uniformly or uniformly sampled in one dimension (e.g., range, range rate, azimuth, etc.) in spatial distribution, such as a spatial grid. In one example, and for purposes of discussion, a simplistic representation of the objects in the environment 108 includes four data points of the point cloud data, each data point represents an object in the environment 108. For example, a first data point represents object 202, a second data point represents object 204, a third data point represents object 206 and a fourth data point represents object 208. While the example refers to a single data point representing a single object in the environment 108, it is understood that a grouping or cluster of data points (with each point in the group at a different location on the surface of the actual object) more commonly represents the single object.

In the illustrated example, the data points 220, 222, 224 and 226 respectively correspond to objects 202, 204, 208 and 206 in the environment 108. Since the data points collected for the environment 108 may be captured by different sensors or from different angles, the data points are correlated to account for any offsets of the sensors and angles used to obtain the data. In order to determine these offsets, the point cloud. data is arranged into lists of data points for each attribute (e.g., range, range rate, azimuth, elevation, power) at the same scan points (i.e., points with the same timestamp). For example, a list of data points may be arranged for each attribute or dimension. The list of range data points may appear as [range of data point 220, range of data point 222, range of data point 224 and range of data point 226]. The list of range rate data points may appear as [range rate of data point 220, range rate of data point 222, range rate of data point 224 and range rate of data point 226]. The list of azimuth. data points may appear as [azimuth of data point 220, azimuth rate of data point 222, azimuth rate of data point 224 and azimuth rate of data point 226]. The list of power data points may appear as [power of data point 220, power rate of data point 222, power rate of data point 224 and power rate of data point 226]. A similar list of data points may also be arranged for elevation.

In some examples, offsets may be calculated for each of the lists. For example, for each data point at each attribute (range, range rate, azimuth, elevation, power), offset data 112 may be determined as the difference between a data point and some or all other data points in the point cloud data.

A list of the range offset (or range value differences between data points) data may be calculated as [(range of data point 220—range of data point 222), (range of data point 220—range of data point 224), (range of data point 220—range of data point 226), (range of data point 222—range of data point 224), (range of data point 222—range of data point 226), (range of data point 224—range of data point 226)].

The list of the range rate offset data may be calculated as [(range rate of data point 220—range rate of data point 222), (range rate of data point 220—range rate of data point 224), (range rate of data point 220—range rate of data point 226), (range rate of data point 222—range rate of data point 224), (range rate of data point 222—range data of data point 226), (range rate of data point 224—range rate of data point 226)].

The list of power offset data (or power value differences between data points) may be calculated as [(power of data point 220—power of data point 222), (power of data point 220—power of data point 224), (power of data point 220—power of data point 226), (power of data point 222—power of data point 224), (power of data point 222—power of data point 226), (power of data point 224—power of data point 226)].

The list of azimuth offset data may be calculated as [(azimuth of data point 220—azimuth of data point 222), (azimuth of data point 220—azimuth of data point 224), (azimuth of data point 220—azimuth of data point 226), (azimuth of data point 222—azimuth of data point 224), (azimuth of data point 222—azimuth of data point 226), (azimuth of data point 224—azimuth of data point 226)].

A similar list of offset data may also be calculated or otherwise determined for elevation.

In the depicted example, the offset data 112 for each of the data points 220, 222, 224 and 226 for each attribute is illustrated as dashed lines. For example, the list of range offsets is shown as the difference between data point 220 and data point 222 (line 230A), the difference between data point 220 and data point 224 (line 230B), of the difference between data point 220 and data point 226 (line 230C), the difference between data point 222 and data point 224 (line 232A), the difference between data point 222 and data point 226 (line 232B), and the difference between the data point 224 and data point 226 (line 234A).

Figure 3:
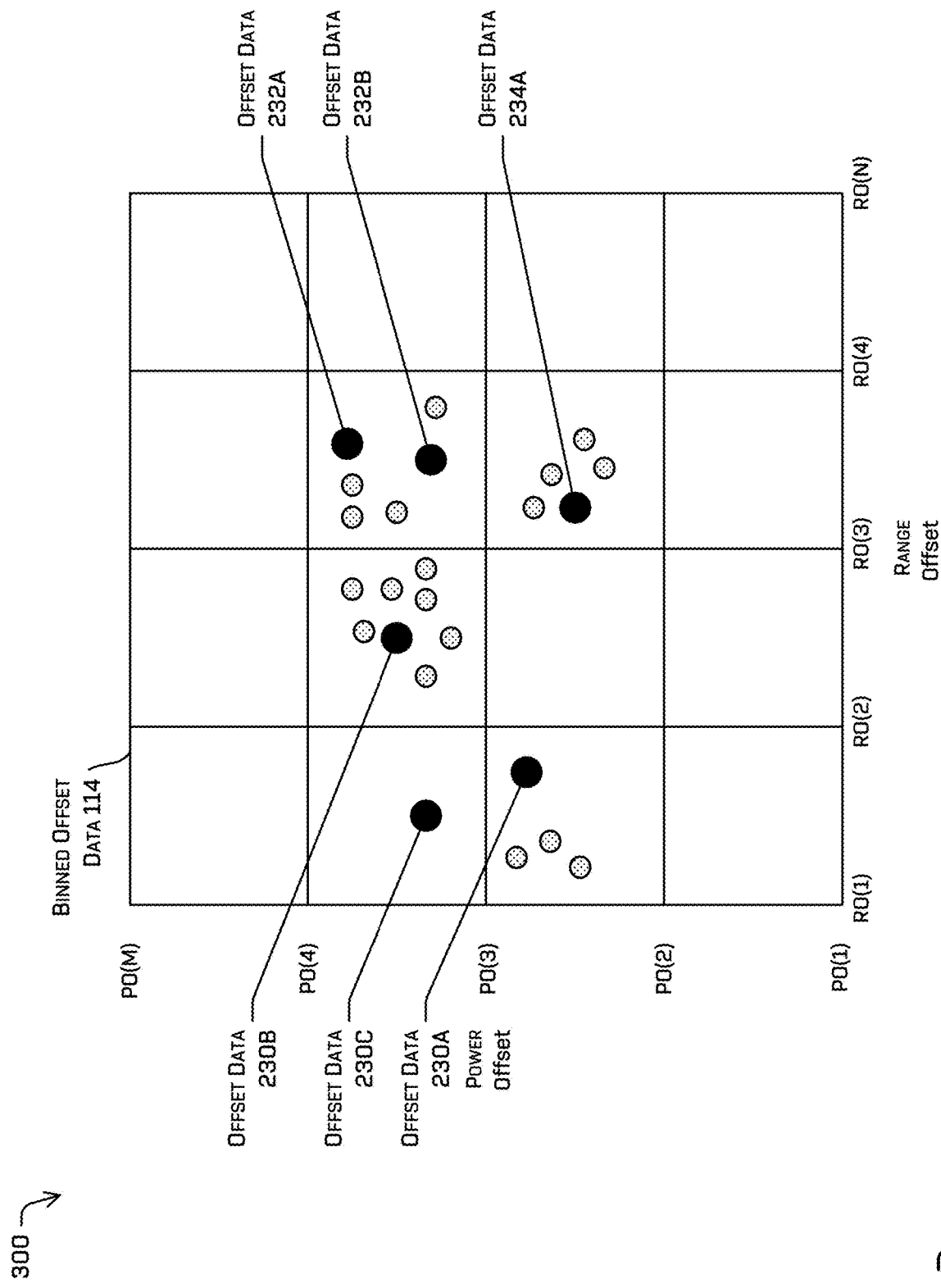
FIG. 3 illustrates an example of the offset data of FIG. 2 distributed into a spatial grid.

FIG. 3 illustrates an example of the offset data of FIG. 2 distributed into a spatial grid. A bin may comprise offset data 112 associated with a set of ranges, range rates, azimuths, elevations, and/or received powers. For example, a particular bin may include the received power data associated with any object detections associated with various dimensions, such as a range of azimuths, ranges, elevation ranges and/or range rates specified by the bin. In the depicted example, the offset data 112 is shown as offset data points (e.g., offset data 230A, 230B, 230C, 232A, 232B, and 234A, plus additionally collected offset data points shown shaded in grey) corresponding to a particular power offset (PO) at a particular range offset (RO). In some instances, a bin may be associated with and/or represented as a cell in the spatial grid 300 and associated with regions or locations of the environment 108. In some examples, a bin may be associated with a set constant and/or range of values in one or more dimensions of the sensor data. For example, a bin may be set to a constant size or may be associated with a range of ranges (i.e., distances), a range of azimuths, a range of elevations, and/or any range rate (i.e., doppler value). In some examples, instead of binning the offset data 112, the offset data 112 may be randomly, continuously or uniformly distributed in the spatial grid 300.

The spatial grid 300 is shown as a 4×4 grid for simplicity in this example. However, in other examples, any size (e.g., area in the real world associated with the spatial grid), shape (e.g., length and width of the spatial grid), and resolution (e.g., size of cells used to make up the spatial grid) may be used for the spatial grid 300 depending on the accuracy and precision needed, bin dimensions, memory size constraints, processing speed and load constraints, sensor range limitations, and the like. In some examples, a spatial grid 300 may be sized and shaped to match a reliable range of the sensors that are used to capture sensor data from which the spatial grid 300 is populated, and the resolution may be chosen by maximizing accuracy and precision needed for a given application, a given memory, and processing constraints.

In some examples, the length and the width of the spatial grid 300 may be the same, while in other examples the length and width may be different. Still in other examples, the bin boundaries (or ranges) may be selected based on a probability that data within each of the bins follows a discrete uniform distribution. in this way, a heterogeneous distribution can be divided into bins in which internal observations are homogenous. Bin boundaries may be identified by characteristics exhibited in the distributions. For example, bin ranges may be defined based on changes in the observed data using a statistical approach for identifying meaningful range end points of the bin in the distribution.

In one specific example as illustrated, the size of the spatial grid 300 has a horizontal axis representing range offset data and a vertical axis representing power offset data. The range of values along the horizontal axis may be measured for example in meters (m), where the width of each cell is a specific range of distance (range) values. The range of values along the vertical axis may be measured for example in decibels (dB), where the length of each cell is a specific range of power values. The range values (e.g., end point-to-end point) for cells may be determined as discussed above. Each cell may also be associated with a resolution of "x" meters per cell. For example, a cell may have a high-resolution of 200 millimeters at a distance of 25 meters per cell while a reduced resolution may be about 400 millimeters at a distance of 25 meters per cell. The resolution may be determinative of the granularity at which the sensors are able to reliably detect objects in the environment 108 and may be changed to accommodate the needs of the sensors and autonomous vehicle 110. It will be understood that a wide range of resolutions are possible within the scope of this disclosure.

Once the parameters for the spatial grid 300 have been defined, the offset data 112 may be distributed (i.e., binned) into the corresponding cells of the spatial grid 300. For example, the offset data 112 is binned into the cell having a bin range that corresponds to the particular dimension(s) of the sensor data. The offset data 112 binned into a cell is referred to herein as binned offset data 114. For example, as the sensors collect sensor data of a first object in the environment 108, the sensor data for a power offset between PO(2) and PO(3) with a range offset between RO(1) and RO(2) is binned into the correspond cell of the spatial grid 300. Accordingly, the binned offset data 114 in each cell of the spatial grid 300 is an accumulation (i.e., count) of the sensor data (having been offset) in which the dimension(s) of the sensor data fall into a bin range of a specific cell.

In the depicted example, the spatial grid 300 shows data points 220, 222, 224 and 226 of the offset data 112 (FIG. 2), along with other sensor data (i.e., additional offset data shown as shaded in great) collected by the sensors over a period of time and binned into respective cells of the spatial grid 300. The power offset values (e.g., PO(1), PO(2), PO(3), PO(4) and PO(M)) for a data point are shown along the vertical axis of the spatial grid 300 and the range offset values (e.g., RO(1), RO(2), RO(3), RO(4) and RO(N)) for a data point are shown along the horizontal axis of the spatial grid 300. Accordingly, the power offset range (end-to-end points in each power offset bin) for the cells in the spatial grid 300 are PO(1)-PO(2), PO(2)-PO(3), PO(3)-PO(4) and PO(4)-PO(M), and the range offset range (end-to-end points in each range offset bin) for the cells in the spatial grid 300 are RO(1)-RO(2), RO(2)-RO(3), RO(3)-RO(4), and RO(4)-RO(N). In the example of data point 220, the power offset value is within the range of PO(2)-PO(3) and the range offset value is within the range of RO(1)-RO(2). Data points 222, 224 and 226 have similar power offset value ranges and range offset value ranges. For example, data point 222 has a power offset value within the range of PO(3)-PO(4) and a range offset value within the range of RO(2)-RO(3). Data point 224 has a power offset value within the range of PO(2)-PO(3) and a range offset value within the range of RO(3)-RO(4). Data point 226 has a power offset value within the range of PO(3)-PO(4) and a range offset value within the range of RO(3)-RO(4).

It is appreciated that the number of data points illustrated in the example is for simplicity of discussion and that any number of data points collected by the sensors may binned into cells of the spatial grid. Moreover, the data points depicted herein are shown as two-dimensional power and range offset data. However, the data represented may be two or more dimensional. That is, sensor data and/or object detections may comprise one or more dimensions including, for example, the range (i.e., distance), the range rate (i.e., doppler), the azimuth (i.e., scanning angle), the elevation (i.e., altitude), the power (i.e., magnitude of returned radar signal, for example, determined based on a radar cross section (RCS)), and the like. In other words, although the example shows data points with respect to power and range, the spatial grid may comprise data points for a received power indicated by the sensors over time at a particular azimuth and/or range rate in addition to or as an alternative to showing the range.

The binned offset data 114 may then be used to construct a frequency distribution (i.e., frequency histogram) showing the frequency of distribution for data points in the cells of the spatial grid 300 (i.e., showing the number of data points in each cell of the spatial grid 300).

Figure 4:
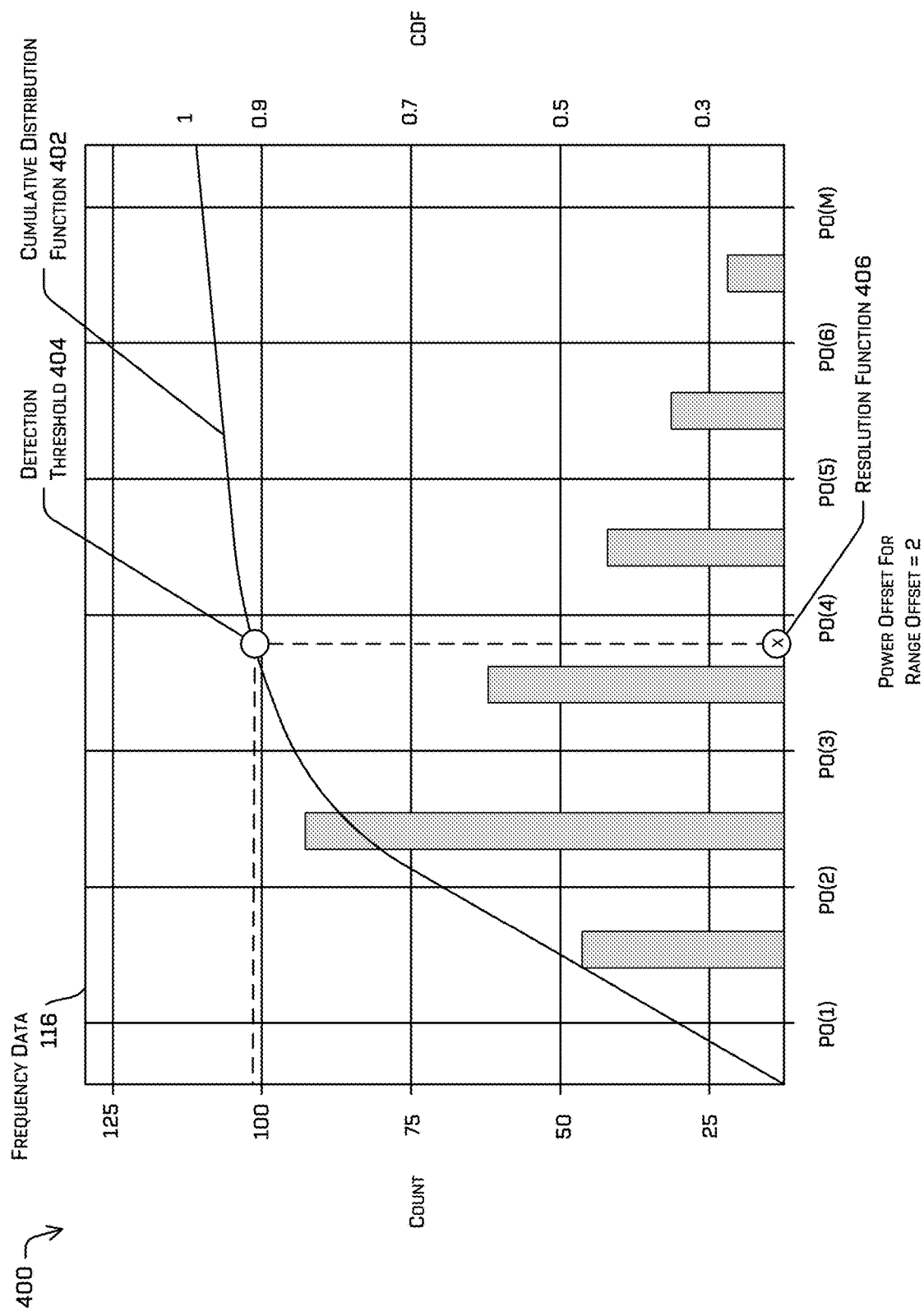
FIG. 4 shows an example frequency distribution graph of the binned offset data in FIG. 3.

FIG. 4 shows an example frequency distribution graph of the binned offset data in FIG. 3, which may be used to determine a resolution function based on a cumulative distribution function (CDF) of the frequency data 116 and a detection threshold 404. The frequency distribution (i.e., frequency histogram) is generated based on the binned offset data 114, where the horizontal axis corresponds to bins for the power offset values at a range offset for a particular value. The vertical axis corresponds to the total count of data points for each bin in the spatial grid 300. Each vertical bar in the graph 400 corresponds to a different bin for the power offset of a range offset at a particular value (e.g., a power offset between PO(2)-PO(3) for a range offset equal to 2). Accordingly, the horizontal axis shows power offset bins with a range between PO(1)-PO(M) for a particular range offset value (in the example, a value equal to 2), and the vertical axis shows the total count of data points between a range of 0 and 125.

Although the binned offset data 114 is shown for a power offset of a range offset equal to 2, the data represented in the graph 400 may comprise different range offset values. Additionally, the power offset may represent data for a different dimension. For example, the frequency distribution in the graph 400 may be for the power offset for a particular value of any dimension (e.g., range, range rate and/or azimuth). In other words, the graph 400 may comprise a total count on the vertical axis with a power offset for any dimension, and is not limited to a range dimension as illustrated.

The frequency distribution, comprising frequency data 116, in graph 400 may then be converted to a cumulative distribution function (CDF) 402 using equation (1):

$$v_i = \sum_{j=1}^{i} \frac{c_j}{N},$$

where $C_j$ is the count at power offset bin j, N is the total histogram count and $V_i$ is the CDF 402 value at power offset bin i. The CDF 402 quantifies the probability of observing certain data point intensities within the collected sensor data. In this case, the CDF 402 quantifies the probability that the sensors on the autonomous vehicle 110 will observe or detect a data point with a certain intensity (e.g., power intensity) in the environment 108.

For the sensors to observe or detect the data points, the sensors are set to a specific resolution. The resolution may be determined, for example, using a resolution function 406 that is based on the CDF 402 and a detected threshold 404, as explained below. The resolution of the sensors allows the sensors to resolve objects (data points) detected in the environment 108. This is particularly true for objects that are in close proximity to one another, where one object's reflection signal from a radar signal may interfere with the other object's reflection signal. For example, a resolution function 406 can be determined to measure the extent to which any two objects (e.g., objects 202 and 204) have to be separated in order to be recognized as two different objects.

In some examples, noise or interference may be spread by the reflection signals of different objects, particularly as the number of dimensions (attributes) of the reflection signals increase. For example, the sensors on the autonomous vehicle 110 may detect another vehicle in the environment 108 as point cloud data, in which each point scatter is received as a reflection signal in the form of spread energy with multiple dimensions. In one instance, the dimensions may include range, range rate, azimuth and power. Thus, each reflection signal has a multi-dimensional spread of energy. As the number of dimensions increase, noise or interference may be spread that increases the chances of the returned reflection signals causing a false detection (i.e., a false negative). As used herein, the returned reflection signal (or reflection signal) is a portion of a signal generated by a sensor responsive to a reflection of radio waves from an object to the sensor. A radar device may identify a portion of the signal as being a return signal by determining a detection threshold and determining that the return signal is a portion of the signal that meets or exceeds the detection threshold.

In the example of FIG. 4, and for purposes of discussion, the detection and processing at each of the dimensions for the reflected signals is performed individually in two dimensions. For example, as illustrated, the detection and processing of the reflection signal is shown for a two-dimensional (2D) power offset at a particular range offset (e.g., power offset for range offset equal to 2). In the case of the frequency distribution shown in graph 400, a value of the resolution function 406 is selected as the power offset value corresponding to a detection threshold 404 point at a dimension (e.g., range, range rate or azimuth value).

In some examples, the detection threshold 404 is determined based on the CDF 402. For example, the detection threshold 404 may be determined such that a majority of the data points collected by the sensors of the autonomous vehicle 110 are detected for a range of power offset values in different dimension offsets (e.g., a range offset), discussed further below. In one example, the power offset value corresponding to the 99$^{th}$ percentile point on the CDF 402 is selected as the value of the resolution function 406 at a particular dimension value. In the example of FIG. 4, selecting the detection threshold 404 as a 90 percentile point on the CDF 402 ensures that the resolution function 406 is set at a power offset value for the range offset equal to 2 such that 99% of the data points detected by the sensors will be detected as a True positive detection (e.g., the detection of the data point is an accurate detection of an object in a location of the environment).

In one example, the sensors in the autonomous vehicle 110 may collect sensor data and determine a detection threshold 404 based at least in part on properties of the sensor data (e.g., average magnitude, average power), which may depend on a hardware and/or software configuration of the sensors (e.g., depending on the kind of constant false alarm rate (CFAR) algorithm used by the sensors of the radar). Note that detection threshold 404 is depicted in the example as a percentage point of the power offset value, although additional or alternate values are contemplated. In some examples, the sensors may output an object detection associated with a portion of the sensor data that falls within the detection threshold 404 (i.e., data points below the detection threshold 404 under the CDF 402 curve and to the left of the resolution function 406, as illustrated in FIG. 4). An "object detection," as relates to radar data, may comprise an indication generated by a radar device that an object has been detected, based at least in part on identifying a return signal. An object detection may be a true positive when the object detection is associated with an object. A failure of the radar device to identify a portion of the signal as being associated with an object and therefore failing to generate an object detection for the object may be a false negative.

In one example, the data points (represented as a vertical bar) in the power offset bin range between PO(1) and PO(4) are detectable, with the exception of some points above the CDF 402 curve in bin power offset range PO(2)-PO(3) (data points above the CDF 402 are discounted). In this case, any returned sensor data attributable to signals reflected from an object is a true positive detection. If other portions of the signals reflected from an object do not generate an object detection, then the returned portion of the reflected signals do not meet the detection threshold 404 and that portion has a likelihood of being a false negative detection. For example, the data points (represented as a vertical bar) in the power offset bin range PO(4)-PO(M) are not detectable as they do not fall within the detection threshold 404 (i.e., data points below the detection threshold 404 under the CDF 402 curve and to the right of the resolution function 406, as illustrated in FIG. 4).

Note that the graph depicted herein is shown as a 2D graph, although the data represented therein may be two or more dimensional. For example, sensor data (e.g., data points) may comprise one or more dimensions. In other words, graph 400 may comprise a received power indicated by a sensor over time at any one of the dimensions.

Figure 5:
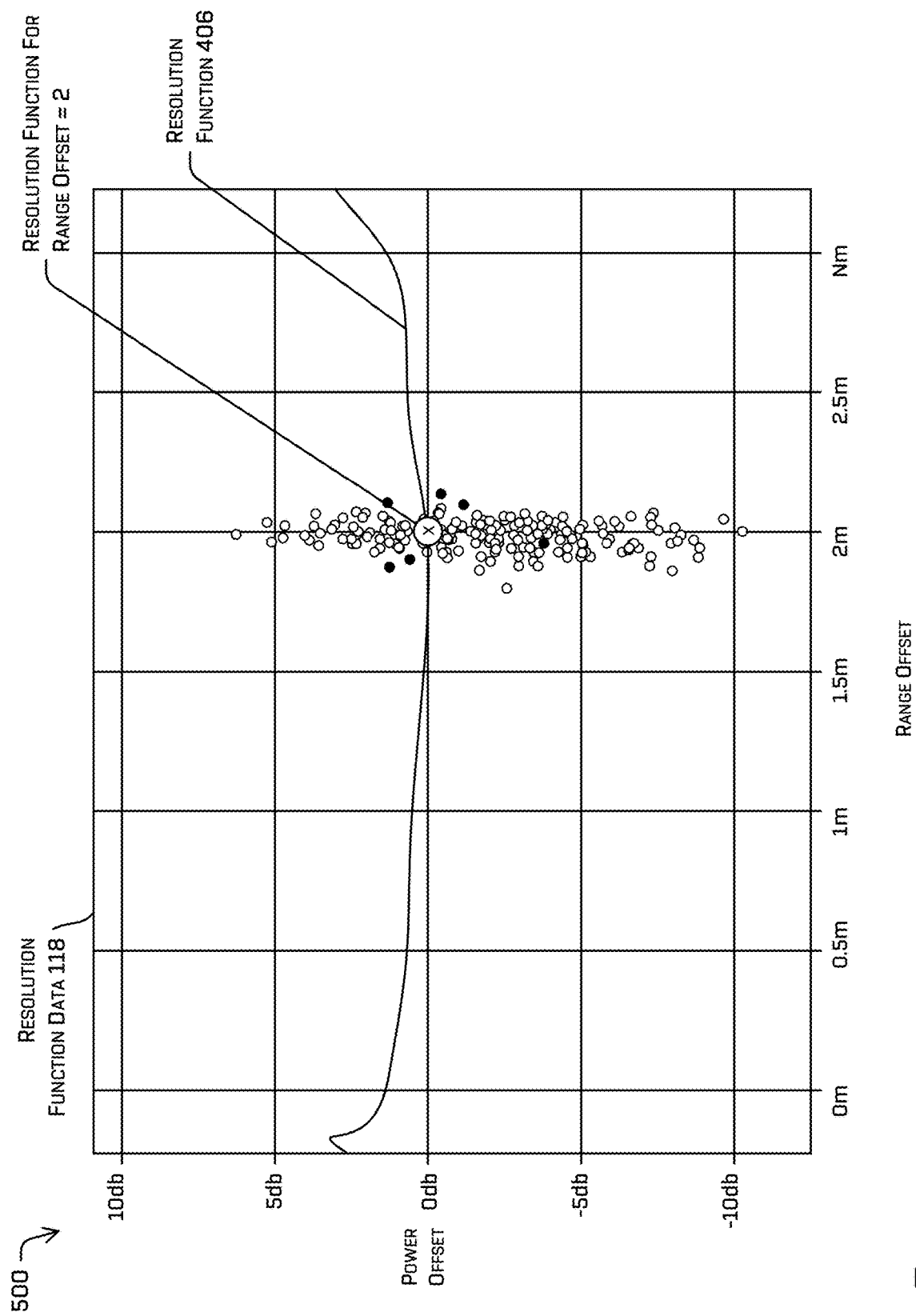
FIG. 5 illustrates a cross-section view of the resolution function of FIG. 4 at a range of power offsets and range offsets.

FIG. 5 illustrates a cross-section view of the resolution function of FIG. 4 at a range of power offsets and range offsets. A resolution function defines what may be resolved, such as the resolution of a sensor. The cross-section illustrates one example of resolution function data 118 that shows the resolution function 406 at a range of power offsets for a range of distance (range) offsets. In one example, the resolution function 406 is shown as a curve between a range of power offset values (e.g., −10 dB-+10 dB) for a range of distance (range) offset values (e.g., 0— N meters). The power offset ranges of −10 dB-+10 dB on the vertical axis correspond to, for example, the power offset ranges PO(1)-PO(M) in FIG. 4. The range offset value equal to 2 meters on the horizontal axis corresponds to, for example, the range offset value equal to 2 meters for the power offset ranges shown in FIG. 4. Likewise, the resolution function 406 in FIG. 4 corresponds to the resolution function 406 identified in FIG. 5, where the resolution function 406 is determined based at least in part on the detection threshold 404.

In one example, a distribution of data points is shown for a range of power offsets (e.g., −10 dB-+10 dB) for a range offset equal to 2. The data points correspond to, for example, the data points in FIG. 4 represented by the vertical bars. The black dots represent offset data shown, for example, in FIG. 3. Data points above the resolution function 406 are likely to not be detected by the sensors as they fall above the detection threshold 404 point on the CDF 402. For example, as the power offset values increase on graph 500 (at a same range), the likelihood of detecting data points are reduced.

In some examples, a larger power offset value may be indicative of a larger object being detected by the sensors, where the larger object produces a larger spread of energy when reflecting radar signals. This spread of energy may block or mask other objects in close proximity given its power intensity. For example, a smaller object in close proximity to a larger object may be masked by the spread of energy from the larger object. As the distance between the larger and smaller objects decreases, the energy spread of the larger object has more of an effect on the sensors ability to detect the smaller object since the spread of energy reflected from the larger object is more likely to block or mask the smaller object. Thus, with a decrease in distance between objects, an object with a larger power intensity has more of an effect on the sensors ability to detect smaller objects.

In one example, the power offset decreases and/or the distance between objects increases. With reference to the figure, the data points below the resolution function 406 are likely to be detected by the sensors since they fall below the resolution function 406 (and the detection threshold 404 point on the CDF 402). For example, as the power offset values decrease on graph 500 (while the distance remains the same), the likelihood of detecting data points increases. For example, a large object such as a truck may have a large power offset value that interferes with sensors from detecting a small object, such as a pedestrian. However, if the truck is replaced with a smaller object, such as a car, having a lower power intensity, it is more likely that the pedestrian will be detected by the sensors since the lower power intensity is less likely to interfere with the sensor readings.

In examples, as the distance between the larger and smaller object increases, the smaller object is more likely to be detected by the sensors. That is, as noted above, as the distance between the larger and smaller objects increases, the spread of energy projected from the larger object has less of an effect on the sensors ability to detect the smaller object since the spread energy is less likely to block or mask the reflection signal of the smaller object given the decrease in power.

In other examples, the power offset increases and/or the distance between objects decreases. With continued reference to the figure, the data points above the resolution function 406 are not likely to be detected by the sensors since they fall above the resolution function 406 (and the detection threshold 404 point on the CDF 402). For example, as the power offset values increase on the graph 500 (for a same distance), the likelihood of accurately detecting data points decreases. In examples, as the distance between the larger and smaller object decreases, the smaller object is less likely to be detected by the sensors. That is, as noted above, as the power offset value between the larger object and the smaller object increases, the larger object projecting the spread of energy has more of an effect on the sensors ability to detect the smaller object since the spread energy is more likely to block or mask the reflection signal of the smaller object given its increase in power intensity.

Note that while the disclosure illustrates a single dimension (e.g., range offset), any dimension associated with the power offset may be contemplated. For example, the range of power offsets for a range of doppler or azimuth offsets may also be illustrated. The single dimension as illustrated is merely for simplicity of discussion and should not be taken as a limiting example.

Figure 6:
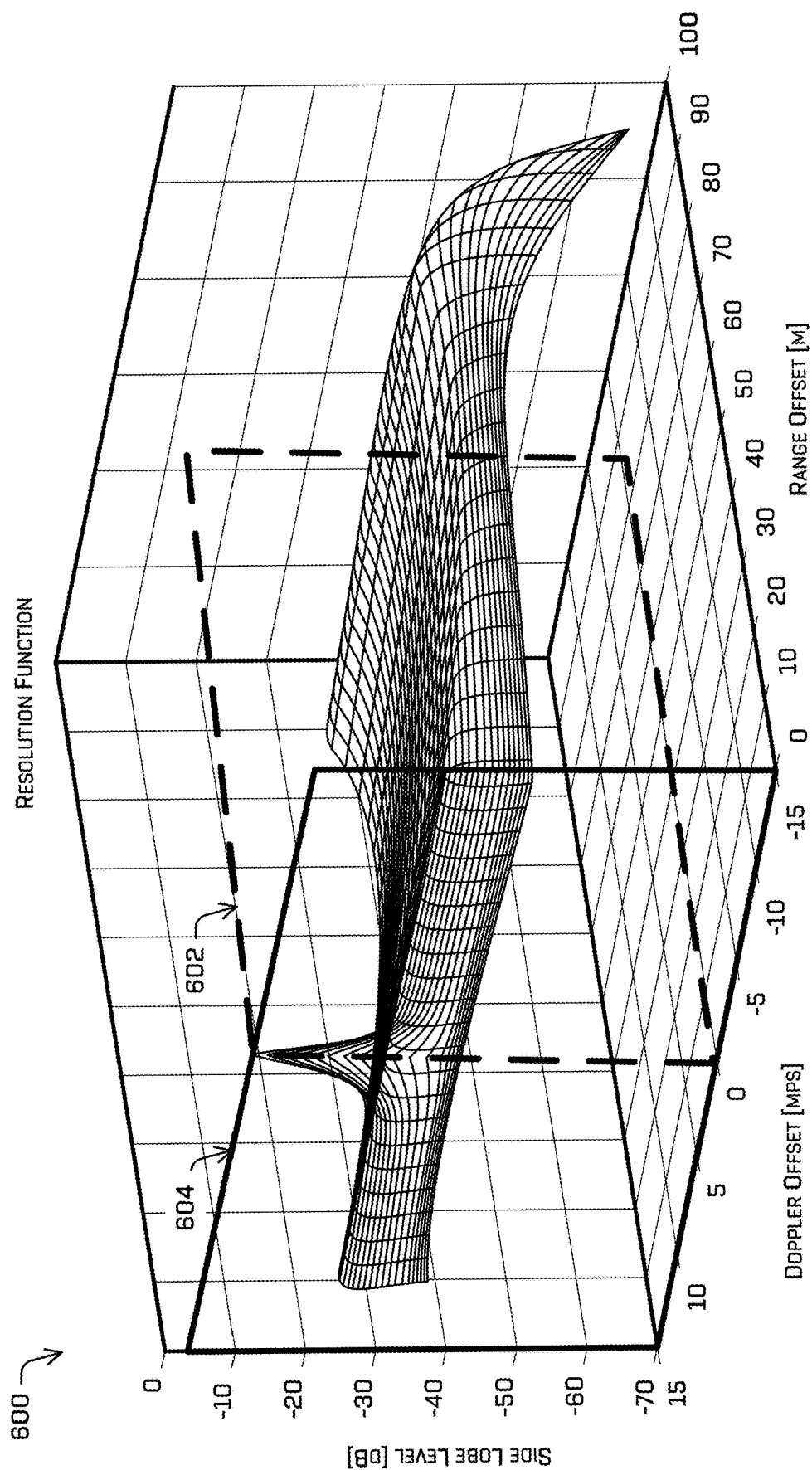
FIG. 6 illustrates a three-dimensional graph representing the resolution function.

FIG. 6 illustrates a three-dimensional (3D) graph 600 representing the resolution function. The cross-section along the first plane 602 represents the graph 500 showing the resolution function 406 for a power and range offset. The 3D graph 600 shows a 3D version of the resolution function, where the resolution function 406 tapers along the range offset axis from a power offset value of approximately −20 dB (at a range offset value equal to 0 meters) until a power offset value of approximately −30 dB (at a range offset of approximately 2 meters). At the upper end of the range offset (e.g., approximately 90 meters), the resolution function 406 becomes noisy. The cross-section along the second plane 604 represents the resolution function 406 for a power and range rate (doppler) offset (cross-section graph not shown). As depicted in the 3D graph 600, the resolution function 406 remains steady along the doppler offset axis at approximately −20 dB until reaching a range offset value of 0. At the range offset value equal to 0, the range offset spikes to approximately −10 dB, indicating an accurate prediction of the resolution function 406. As the range offset increases, prediction of the resolution function 406 decreases within the same range value.

Of course, the graph 600 is but one example and any resolution function determined based on the techniques discussed herein may represent a different function, depending on the sensor data.

Figure 7:
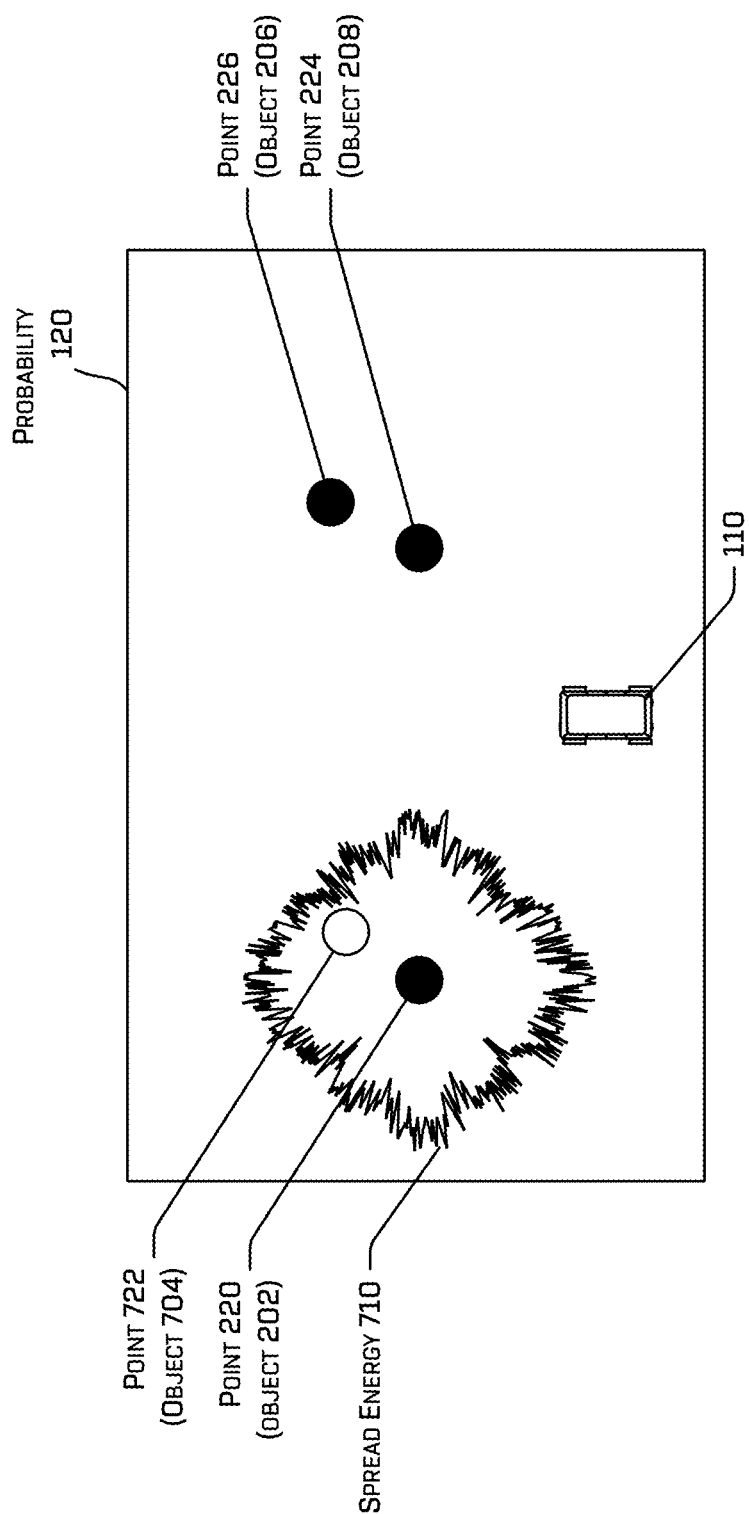
FIG. 7 illustrates an example of determining a probability of a false negative associated with a location in the environment.

FIG. 7 illustrates an example of determining a probability of a false negative associated with a location in the environment. In the illustrated example, the autonomous vehicle 110 is collecting sensor data in an environment 108 that consists of four objects represented by four data points. For example, a first object is represented by data point 220, a second object is represented by data point 722, a third object is represented by data point 226 and a fourth object is represented by data point 224. In one example, the first, second, third and fourth objects correspond to objects 202, 704, 206 and 208 of FIG. 1, respectively. It is appreciated that for purposes of simplicity only four objects (and data points) are being discussed. However, any number of objects (and data points) may be collected by the sensors of the autonomous vehicle 110 and the number of objects (and data points) is not limited to the disclosed example. Objects in the environment 108 are not limited to those depicted and may include any number of different objects. For example, objects may be static or dynamic objects. An example of a static object is a lamp post, whereas an example of a dynamic object is a moving vehicle. In some examples, a parked vehicle can be considered to be a static object, a dynamic object, or a pseudo-dynamic object.

The depicted example illustrates a scenario where spread energy 710 associated with a reflection signal from a first object 202 (e.g., data point 220) interferes with another reflection signal from a second object 704 (e.g., data point 722). A probability component 824 (FIG. 8) of the perception system 820 determines a likelihood that the reflection signal from the first object 202 masks the sensors from detecting object 704 (i.e., the spread energy 710 interferes with the return signal from object 704). For example, the reflection signal from object 202 is identified by the sensors as object 202, resulting in a true positive detection (i.e., object 202 is in the location and accurately detected). However, a reflection signal from object 704 is not detected as a result of the spread energy 710 from object 202, resulting in a false negative detection (i.e., object 704 is in the location but is erroneously undetected). Since the sensors detect object 202 (true positive) but do not detect object 704 (false negative), the sensors would erroneously fail to output an object detection associated with the false negative. Simply stated, the sensors would fail to detect object 704 due to interference by the reflection signal of object 202. Failing to detect object 704 may result in the autonomous vehicle 110 being controlled along a trajectory that places the autonomous vehicle 110 in the path of the undetected object (object 704), which may result in an unsafe driving situation.

In some examples, objects (e.g., objects 224 and 226) located at a distance outside of the spread energy 710 are detected since the spread energy 710 from object 202 does not interfere with the sensors ability to detect a reflected signal from those objects. For example, the distance between object 202 and objects 224 and 226 is far enough that the spread energy 710 does not affect the sensors ability to detect reflection signals.

In some examples, attributes associated with an object (e.g., a pedestrian) may be known or assumed from prior sensor data or historical information, as well as the resolution function applied to determine regions in the environment where there may be a false negative. For example, given a data point from the sensors, and assuming properties or attributes of the object (e.g., pedestrian or other object) and knowledge of the resolution function, regions in the environment may be identified where the object would otherwise be undetected by the sensors. For example, the resolution function can provide a model describing whether, given a first measurement in an environment, the sensor data is likely to represent an object with certain properties (e.g., size, relative reflectivity, relative location, etc.) relative to the detected object. For example, the resolution function can be used to provide information that a region is likely associated with a false negative or a true negative of a non-detected object. In one example, the sensors may be more likely to miss detecting a reflection signal, thereby generating a false negative. For example, and as discussed in the example that follows, larger objects may interfere with smaller objects when in close proximity to each other. Generally, the magnitude of the power of a reflection signal returned from an object may depend on an object type having various size, material, orientation, and/or surface angles of the object which reflected the signal that caused the returned reflection. Therefore, large objects, such as the delivery truck (e.g., object 202) typically create a larger reflection signal than smaller objects, such as a cyclist (e.g., object 704), from a radar signal. For example, the true positive detection may be attributable to the delivery truck and the false negative detection may be attributable to the cyclist. In some examples, a probability of a false negative can be associated with different object types.

In still other examples, first sensors (e.g., LIDAR sensors) may detect an object in a region of the environment 108. For example, the LIDAR sensors may detect fog or steam in the region. Radar sensors may not be sensitive to such fog or steam (or susceptible to false detections from fog or steam) and may determine that the region is not occupied. Further, techniques can include determining that, if an object with expected radar returns (e.g., an expected sensor data profile) was located at the region, the techniques can determine, based on the resolution function, that such an object would definitively be detectable. In some examples, techniques can include, determining, based on the resolution function, that an object with a particular sensor data profile may not be detectable (e.g., that a probability of a false negative is above a threshold). The vehicle can be controlled based on evaluating the region based on the resolution function such that the vehicle can traverse through the region (e.g., if the region is determined not to include an object) or the vehicle can be controlled to avoid the region (e.g., if a probability of a false negative is above a threshold).

In some examples, such large reflection signals caused by the delivery truck, may skew a detection threshold 404 determined by the sensors to be higher because of the greater magnitude of the reflection signal attributable to the larger object. Smaller objects (e.g., the cyclist) within a same or similar region (or region of interest) may go undetected by the sensors because of the skewed detection threshold 404 (skewed as a result of the spread energy). Thus, if the detection threshold 404 does not account for the spread energy 710, the resulting resolution function 406 (determined based at least in part on the detection threshold 404) may also be set at a skewed value. Thus, the range at which a smaller object must be to the larger object to be detected (or undetected) will depend on the detection threshold 404 and the resolution function 406.

In some instances, a position of the autonomous vehicle 110 may additionally or alternatively be determined using perception data, which data may include the resolution function and/or any detected false negative. For example, the perception data may be used to localize a position of the autonomous vehicle 110 on a map, determine one or more trajectories, control motion of the autonomous vehicle 110 to traverse a path or route, and/or otherwise control operation of the autonomous vehicle 110. In one example, a route of the autonomous vehicle 110 from a first location to a second location may be planned. The route may include, for example, a plurality of potential trajectories for controlling motion of the autonomous vehicle 110 in accordance with a receding horizon technique (e.g., 1 micro-second, half a second, four seconds, eight seconds, etc.) and based at least in part on the resolution function 406 and the sensor data to control the vehicle to traverse the route (e.g., in order to avoid any of the detected objects, as well as incorporate likelihood(s) of where an object may not have been detected by a radar device).

FIG. 8 illustrates a block diagram of an example system that implements the techniques discussed herein. In some instances, the system 800 may include a vehicle 110, which may represent the autonomous vehicle 110 in FIG. 1. In some instances, the vehicle 110 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 110 may be a fully or partially autonomous vehicle having any other level or classification. Moreover, in some instances, the techniques described herein may be usable by non-autonomous vehicles as well.

The vehicle 110 may include a vehicle computing device(s) 804, sensor(s) 806, emitter(s) 808, communication connections(s) 810, direct connection 812 and/or drive system(s) 814. In some instances, the sensor(s) 806 may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), time of flight sensors, etc. The sensor(s) 806 may include multiple instances of each of these or other types of sensors. For instance, the radar sensors may include individual radar sensors located at the corners, front, back, sides, and/or top of the vehicle 110. As another example, the cameras may include multiple cameras disposed at various locations about the exterior and/or interior of the vehicle 110. The sensor(s) 806 may provide input to the vehicle computing device(s) 804 and/or to computing device(s) 844.

The vehicle 110 may also include emitter(s) 808 for emitting light and/or sound, as described above. The emitter(s) 808 in this example may include interior audio and visual emitter(s) to communicate with passengers of the vehicle 110. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 808 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 110 may also include communication connection(s) 810 that enable communication between the vehicle 110 and one or more other local or remote computing device(s). For instance, the communication connection(s) 810 may facilitate communication with other local computing device(s) on the vehicle 110 and/or the drive system(s) 814. Also, the communication connection(s) 810 may additionally or alternatively allow the vehicle to communicate with other nearby computing device(s) (e.g., other nearby vehicles, traffic signals, etc.). The communication connection(s) 810 may additionally or alternatively enable the vehicle 110 to communicate with computing device(s) 844. In some examples, computing device(s) 844 may comprise one or more nodes of a distributed computing system (e.g., a cloud computing architecture).

The communication connection(s) 810 may include physical and/or logical interfaces for connecting the vehicle computing device(s) 804 to another computing device or a network, such as network(s) 842. For example, the communication connection(s) 810 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 804 and/or the sensor(s) 806 may send sensor data, via the network(s) 842, to the computing device(s) 844 at a particular frequency, after a lapse of a predetermined period of time, in near real-time, etc.

In some instances, the vehicle 110 may include one or more drive system(s) 814. In some instances, the vehicle 110 may have a single drive system 814. In some instances, the drive system(s) 814 may include one or more sensors to detect conditions of the drive system(s) 814 and/or the surroundings of the vehicle 110. By way of example and not limitation, the sensor(s) of the drive system(s) 814 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive system(s) 814. In some cases, the sensor(s) on the drive system(s) 814 may overlap or supplement corresponding systems of the vehicle 110 (e.g., sensor(s) 806).

The drive system(s) 814 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 814 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive system(s) 814. Furthermore, the drive system(s) 814 may also include one or more communication connection(s) that enable communication by the respective drive component with one or more other local or remote computing device(s).

The vehicle computing device(s) 804 may include processor(s) 816 and memory 818 communicatively coupled with the one or more processors 816. Computing device(s) 804 may also include processor(s) 816, and/or memory 818. The processor(s) 816 and/or 844 may be any suitable processor capable of executing instructions to process data and perform operations as described herein. By way of example and not limitation, the processor(s) 816 and/or 846 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 818 and/or 848 may be examples of non-transitory computer-readable media. The memory 818 and/or 848 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 818 and/or 848 may store a perception system 820, a localization system 828, a prediction system 834, a planning system 836, a map system 838 and/or system controller(s) 840. Perception system 820 may include a resolution function component 822 and a probability component 824. The resolution function component 822 may determine a resolution of the sensor(s) based on application of a cumulative distribution function. The probability component 824 may determine the probability of a false negative associated with a location in the environment. Although perception system 820 and/or planning system 836 are illustrated as being stored in memory 818 (and/or 848), perception system 820 and/or planning system 836 may include processor-executable instructions, machine-learned model(s) (e.g., a neural network), and/or hardware.

The system controller(s) 840 may be configured to control steering, propulsion, braking, safety, emitters, communication, and other systems of the vehicle 110. These system controller(s) 840 may communicate with and/or control corresponding systems of the drive system(s) 814 and/or other components of the vehicle 110. For example, the planning system 836 may generate instructions based at least in part on perception data generated by the perception system 820 (which may comprise any of the radar spatial grids and/or likelihoods discussed herein) and transmit the instructions to the system controller(s) 840, which may control operation of the vehicle 110 based at least in part on the instructions. In some examples, if the planning system 836 receives a notification that a track of an object was "lost" (e.g., an object no longer appears in sensor data that does appear in LIDAR and isn't occluded by any other objects), the planning system 836 may generate an instruction to bring the vehicle 110 to a safe stop and/or to transmit a request for teleoperator assistance.

It should be noted that while FIG. 8 is illustrated as a distributed system, in alternative examples, components of the vehicle 110 may be associated with the computing device(s) 804 (and/or 844) and/or components of the computing device(s) 804 (and/or 844) may be associated with the vehicle 110. That is, the vehicle 110 may perform one or more of the functions associated with the computing device(s) 804, and vice versa.

Figure 9:
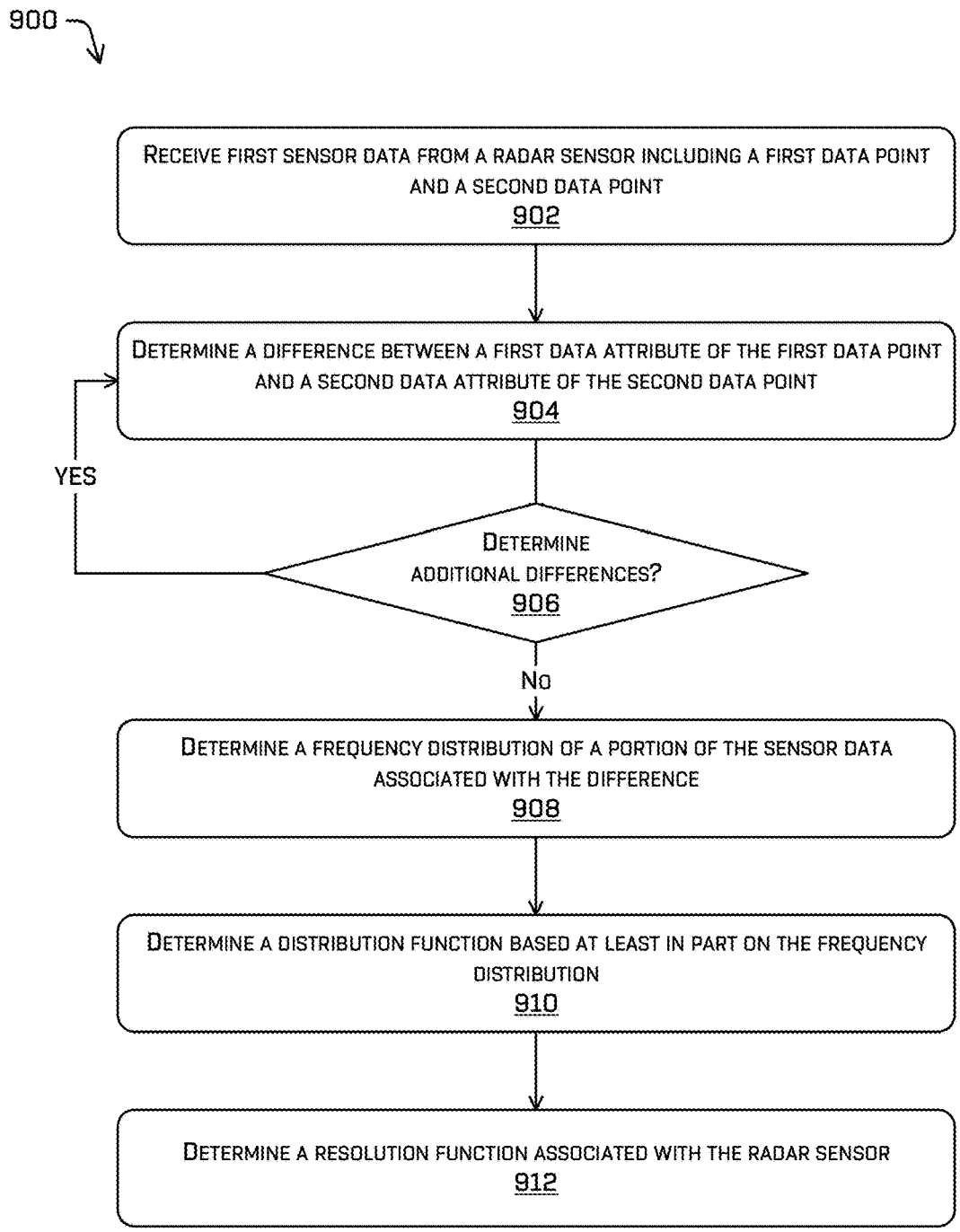
FIG. 9 illustrates an example process for generating a resolution function in accordance with examples of the disclosure.

FIG. 9 illustrates an example process 900 for generating a resolution function in accordance with examples of the disclosure. The process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the process.

At operation 902, radar sensors of sensor system 806 of the autonomous vehicle 110 receives radar sensor data. The radar sensor data received by the radar sensors includes point cloud data having a first data point associated with a first object and a second data point associated with a second object in the environment 108. The first data point and the second data point are associated with attributes (multiple dimensions), such as a range, range rate, azimuth and power. Although each data point may be associated with multiple dimensions, for simplicity of discussion each attribute is discussed with reference to a range attribute and a power attribute.

At operation 904, the processor(s) 816 determines a difference (or range offset) between the range value of the first data point and the range value of the second data point. The processor(s) 816 also determines a difference (or power offset) between the power value of the first data point and the power value of the second data point. In one example, the differences are calculated based on sensor data captured at a same time. An example illustration of the difference is shown in FIG. 2. At operation 906, the processor(s) 816 determine whether additional difference calculations are necessary. If additional difference calculations are required, the process returns to operation 904 to determine the additional differences. Otherwise, the process continues to operation 908.

In some examples, the power offset and range offset values are distributed (binned) onto a spatial grid 300 as each of the difference calculations are determined. An example of binned data points is illustrated in FIG. 3. At step 908, a frequency distribution (i.e., frequency histogram) is determined based on at least a portion of the sensor data associated with the differences (e.g., the binned power offset and range offset values of the first and second data points). An example of the frequency histogram is illustrated in graph 400 of FIG. 4. In one example, the frequency data in the frequency distribution plots the number of data points for the power offset at a particular range offset. For example, for a power offset range between 0 db-5 db of a range offset value of 2, the total count of data points may be 75.

At operation 910, a distribution function (e.g., CDF 402) based at least in part on the frequency distribution is determined. That is, the frequency histogram (in each dimension) is converted to a CDF 402. An example of the distribution function is illustrated in FIG. 4.

At operation 912, a resolution function associated with the radar sensor is determined. In one example, a power offset value corresponding to a predetermined detection threshold (e.g., a 99% detection threshold) is selected on the CDF 402 as the resolution function 406 at a particular dimension offset value (e.g., range offset value). It is appreciated that the detection threshold may be set to any value, including 100%. In some examples, a probability of a false negative or true positive associated with a location in the environment 108 is determined. In some further examples, a region associated with a false negative and a location in an environment 108 is determined based at least in part on the resolution function 406. The autonomous vehicle 110 may then be controlled based on the region.

EXAMPLE CLAUSES

While the example clauses described below are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

A: A system comprising: one or more processors; and one or more non-transitory computer readable media storing computer executable instructions that, when executed, cause the one or more processors to perform operations comprising: receiving first sensor data from a radar sensor associated with an autonomous vehicle, the first sensor data comprising a first data point and a second data point; determining a range value difference between a first range value of the first data point and a second range value of the second data point; determining a power value difference between a first power value of the first data point and a second power value of the second data point; determining, based at least in part on the range value difference and the power value difference, a frequency distribution of a portion of the first sensor data associated with the range value difference; determining, based at least in part on the frequency distribution, a cumulative distribution function; determining, based at least in part on the cumulative distribution function, a resolution function associated with the radar sensor; receiving second sensor data from the radar sensor, the second sensor data comprising a third data point; determining, based at least in part on the resolution function and the third data point, a region associated with a false negative corresponding to a location in an environment; and controlling the autonomous vehicle based on the region.

B: The system of paragraph A, wherein the region is based on an expected sensor profile of an object in the environment.

C: The system of paragraph A or B, having further instructions that, when executed, cause the one or more processors to perform further operations comprising at least one of: determining a range rate difference between the first data point and the second data point; determining an azimuth difference between the first data point and the second data point; determining an elevation difference between the first data point and the second data point; or determining the resolution function further based at least in part on the range rate difference and the azimuth difference.

D: The system of any of paragraphs A-C, having further instructions that, when executed, cause the one or more processors to perform further operations comprising determining a resolution of the radar sensor based on applying a detection threshold to the cumulative distribution function.

E: The system of any of paragraphs A-D, wherein: the frequency distribution of the first sensor data is determined based on the first sensor data captured over a period of time.

F: A method comprising: receiving sensor data from a sensor, the sensor data comprising a first data point and a second data point; determining a difference between a first data attribute of the first data point and a second data attribute of the second data point; determining, based at least in part on the difference, a distribution function; and determining, based at least in part on the distribution function, a resolution function associated with the sensor; and determining a region of interest in an environment based on the resolution function.

G: The method of paragraph F, wherein the difference is a first difference, the method further comprising: determining a second difference between the first data attribute of the first data point and a third data attribute of a third data point; and determining, based at least in part on the second difference, the distribution function of a portion of the sensor data associated with the second difference.

H: The method of paragraph G, wherein the first data attribute, the second data attribute and the third data attribute are one or more of a range, range rate, azimuth, elevation, or power.

I: The method of any of paragraphs F—H, further comprising: receiving second sensor data from the sensor, the second sensor data comprising a third data point; and determining, based at least in part on the resolution function and the third data point, a probability of a false negative or a true negative.

J: The method of paragraph I, wherein the sensor data is radar sensor data from a radar sensor, the method further comprising: receiving lidar sensor data from a lidar sensor, the lidar sensor data detecting an object in the environment; determining, based on the radar sensor data and the resolution function, that a region associated with the object is not occupied; and controlling the autonomous vehicle based at least in part on an indication that the region associated with the object is not occupied.

K: The method of any of paragraphs F-J, further comprising determining, based at least in part on the difference, a frequency distribution of a portion of the sensor data associated with the difference.

L: The method of any of paragraphs F-K, wherein the distribution function is a cumulative distribution function.

M: The method of paragraph L, further comprising determining the resolution function of the radar sensor based on application of a detection threshold to the cumulative distribution function.

N: The method of any of paragraphs F-M, wherein the distribution function of the sensor data is determined based on the sensor data captured over a period of time.

O: One or more non-transitory computer-readable media storing instructions executable by one or more processors, wherein the instructions, when executed, cause the one or more processors to perform operations comprising: receiving sensor data from a sensor, the sensor data comprising a first data point and a second data point; determining a difference between a first data attribute of the first data point and a second data attribute of the second data point; determining, based at least in part on the difference, a distribution function; and determining, based at least in part on the distribution function, a resolution function associated with the sensor; and determining a region of interest in an environment based on the resolution function.

P: The one or more non-transitory computer-readable media of paragraph O, having further instructions that, when executed, cause the one or more processors to perform further operations comprising: determining a second difference between the first data attribute of the first data point and a third data attribute of a third data point; and determining, based at least in part on the second difference, the distribution function of a portion of the sensor data associated with the second difference.

Q: The one or more non-transitory computer-readable media of paragraph P, wherein the first data attribute, the second data attribute and the third data attribute are one or more of a range, range rate, azimuth, elevation or power.

R: The one or more non-transitory computer-readable media of any of paragraphs O-Q, having further instructions that, when executed, cause the one or more processors to perform further operations comprising: receiving second sensor data from the sensor, the second sensor data comprising a third data point; and determining, based at least in part on the resolution function and the third data point, a probability of a false negative or a true negative.

S: The one or more non-transitory computer-readable media of paragraph R, wherein the sensor data is radar sensor data from a radar sensor, and the one or more non-transitory computer readable media having further instructions that, when executed, cause the one or more processors to perform further operations comprising: receiving lidar sensor data from a lidar sensor, the lidar sensor data detecting an object in the environment; determining, based on the radar sensor data and the resolution function, that a region associated with the object is not occupied; and controlling the autonomous vehicle based at least in part on an indication that the region associated with the object is not occupied.

T: The one or more non-transitory computer-readable media of any of paragraphs O-S, having further instructions that, when executed, cause the one or more processors to perform further operations comprising determining the resolution function of the sensor based on application of a detection threshold to the distribution function.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more non-transitory computer readable media storing computer executable instructions that, when executed, cause the one or more processors to perform operations comprising:
      receiving first sensor data from a radar sensor associated with an autonomous vehicle, the first sensor data comprising a first data point and a second data point;
      determining a range value difference between a first range value of the first data point and a second range value of the second data point;
      determining a power value difference between a first power value of the first data point and a second power value of the second data point;
      determining, based at least in part on the range value difference and the power value difference, a frequency distribution of a portion of the first sensor data associated with the range value difference;
      determining, based at least in part on the frequency distribution, a cumulative distribution function;
      determining, based at least in part on the cumulative distribution function, a resolution function associated with the radar sensor;
      receiving second sensor data from the radar sensor, the second sensor data comprising a third data point;
      determining, based at least in part on the resolution function and the third data point, a region associated with a false negative corresponding to a location in an environment; and
      controlling the autonomous vehicle based on the region.

2. The system of claim 1, wherein the region is based on an expected sensor profile of an object in the environment.

3. The system of claim 1, having further instructions that, when executed, cause the one or more processors to perform further operations comprising at least one of:
   determining a range rate difference between the first data point and the second data point;
   determining an azimuth difference between the first data point and the second data point;
   determining an elevation difference between the first data point and the second data point; or
   determining the resolution function further based at least in part on the range rate difference and the azimuth difference.

4. The system of claim 1, having further instructions that, when executed, cause the one or more processors to perform further operations comprising determining a resolution of the radar sensor based on applying a detection threshold to the cumulative distribution function.

5. The system of claim 1, wherein:
the frequency distribution of the first sensor data is determined based on the first sensor data captured over a period of time.

6. A method comprising:
receiving sensor data from a sensor, the sensor data comprising a first data point and a second data point;
determining a difference between a first data attribute of the first data point and a second data attribute of the second data point;
determining, based at least in part on the difference, a distribution function; and
determining, based at least in part on the distribution function, a resolution function associated with the sensor; and
determining a region of interest in an environment based on the resolution function.

7. The method of claim 6, wherein the difference is a first difference, the method further comprising:
determining a second difference between the first data attribute of the first data point and a third data attribute of a third data point; and
determining, based at least in part on the second difference, the distribution function of a portion of the sensor data associated with the second difference.

8. The method of claim 7, wherein the first data attribute, the second data attribute and the third data attribute are one or more of a range, range rate, azimuth, elevation, or power.

9. The method of claim 6, further comprising:
receiving second sensor data from the sensor, the second sensor data comprising a third data point; and
determining, based at least in part on the resolution function and the third data point, a probability of a false negative or a true negative.

10. The method of claim 9, wherein the sensor data is radar sensor data from a radar sensor, the method further comprising:
receiving lidar sensor data from a lidar sensor, the lidar sensor data detecting an object in the environment;
determining, based on the radar sensor data and the resolution function, that a region associated with the object is unoccupied; and
controlling an autonomous vehicle based at least in part on an indication that the region associated with the object is unoccupied.

11. The method of claim 6, further comprising determining, based at least in part on the difference, a frequency distribution of a portion of the sensor data associated with the difference.

12. The method of claim 6, wherein the distribution function is a cumulative distribution function.

13. The method of claim 12, further comprising determining the resolution function of the sensor based on application of a detection threshold to the cumulative distribution function.

14. The method of claim 6, wherein
the distribution function of the sensor data is determined based on the sensor data captured over a period of time.

15. One or more non-transitory computer-readable media storing instructions executable by one or more processors, wherein the instructions, when executed, cause the one or more processors to perform operations comprising:
receiving sensor data from a sensor, the sensor data comprising a first data point and a second data point;
determining a difference between a first data attribute of the first data point and a second data attribute of the second data point;
determining, based at least in part on the difference, a distribution function;
determining, based at least in part on the distribution function, a resolution function associated with the sensor; and
determining a region of interest in an environment based on the resolution function.

16. The one or more non-transitory computer-readable media of claim 15, having further instructions that, when executed, cause the one or more processors to perform further operations comprising:
determining a second difference between the first data attribute of the first data point and a third data attribute of a third data point; and
determining, based at least in part on the second difference, the distribution function of a portion of the sensor data associated with the second difference.

17. The one or more non-transitory computer-readable media of claim 16, wherein the first data attribute, the second data attribute and the third data attribute are one or more of a range, range rate, azimuth, elevation or power.

18. The one or more non-transitory computer-readable media of claim 15, having further instructions that, when executed, cause the one or more processors to perform further operations comprising:
receiving second sensor data from the sensor, the second sensor data comprising a third data point; and
determining, based at least in part on the resolution function and the third data point, a probability of a false negative or a true negative.

19. The one or more non-transitory computer-readable media of claim 18, wherein the sensor data is radar sensor data from a radar sensor, and
the one or more non-transitory computer readable media having further instructions that, when executed, cause the one or more processors to perform further operations comprising:
receiving lidar sensor data from a lidar sensor, the lidar sensor data detecting an object in the environment;
determining, based on the radar sensor data and the resolution function, that a region associated with the object is unoccupied; and
controlling an autonomous vehicle based at least in part on an indication that the region associated with the object is unoccupied.

20. The one or more non-transitory computer-readable media of claim 15, having further instructions that, when executed, cause the one or more processors to perform further operations comprising determining the resolution function of the sensor based on application of a detection threshold to the distribution function.

* * * * *